United States Patent
Haka

(10) Patent No.: US 8,365,620 B2
(45) Date of Patent: Feb. 5, 2013

(54) RACK AND PINION GEAR

(76) Inventor: Agron Haka, Halilaj Bubullime Lushnje (AL)

(*) Notice: Subject to any disclaimer, the term of this patent is extended or adjusted under 35 U.S.C. 154(b) by 471 days.

(21) Appl. No.: 12/513,852

(22) PCT Filed: Nov. 7, 2006

(86) PCT No.: PCT/IB2006/003121
§ 371 (c)(1),
(2), (4) Date: May 6, 2009

(87) PCT Pub. No.: WO2008/056196
PCT Pub. Date: May 15, 2008

(65) Prior Publication Data
US 2010/0282007 A1 Nov. 11, 2010

(51) Int. Cl.
*F16H 37/00* (2006.01)
*F16H 37/16* (2006.01)
*F16H 19/04* (2006.01)
*F16H 19/08* (2006.01)

(52) U.S. Cl. .......................................... 74/33; 74/15.88

(58) Field of Classification Search ................ 74/29–32, 74/33, 13, 15.69, 15.88; 123/197.1–197.5
See application file for complete search history.

(56) References Cited

U.S. PATENT DOCUMENTS

| | | | | |
|---|---|---|---|---|
| 1,545,516 A * | 7/1925 | Powell | .......................... | 74/29 |
| 1,561,708 A * | 11/1925 | Feagan | .......................... | 74/32 |
| 1,633,847 A * | 6/1927 | Crawford | .................... | 74/15.88 |
| 1,636,612 A * | 7/1927 | Noah | ................................ | 74/32 |
| 1,679,580 A * | 8/1928 | Masel | ............................... | 74/32 |
| 2,151,759 A * | 3/1939 | Hardensett | ................... | 60/39.62 |
| 2,337,330 A * | 12/1943 | Julin | ................................ | 74/29 |
| 2,406,264 A * | 8/1946 | Stevens | .......................... | 60/719 |
| 2,697,355 A * | 12/1954 | Mcaninch et al. | ........... | 74/15.86 |
| 2,752,795 A * | 7/1956 | Tangen | ......................... | 74/15.86 |
| 2,757,547 A * | 8/1956 | Julin | ................................ | 74/131 |
| 3,023,640 A * | 3/1962 | Schou | ............................ | 475/70 |
| 4,108,578 A * | 8/1978 | Corey | ............................ | 417/331 |
| 4,135,409 A * | 1/1979 | Ishimaru | ......................... | 74/76 |
| 4,638,676 A * | 1/1987 | Lively et al. | ..................... | 74/31 |
| 5,406,859 A * | 4/1995 | Belford | ............................ | 74/31 |
| 6,981,483 B1 * | 1/2006 | Keip | ......................... | 123/197.1 |
| 7,475,666 B2 * | 1/2009 | Heimbecker | ............. | 123/197.1 |

* cited by examiner

*Primary Examiner* — Justin Krause
(74) *Attorney, Agent, or Firm* — William A. Loginov, Esq.; Loginov & Associates, PLLC

(57) ABSTRACT

A motor vehicle including an internal combustion engine, which utilizes a power take-off mechanism, that converts the reciprocating linear motion of the piston into reciprocating angular motion of the gearing cylinder, being in gear with the partially teethed connecting rod via right angled teeth and rotating motion of the drive shaft which runs coaxially through the gearing cylinder and vice versa. The mechanism has means for causing the piston to pause while the drive shaft rotates. The motor vehicle comprises a fuel heater, an exhaust cleaner including a sinuous tube and liquid for separating impure components of exhaust, a main control module controlling the function of the engine and piston function, a second control module controlling the engine during the minimal running state, thus controlling the pause time of the piston, a third control module controlling the energy flow to the heater, the fuel feeder, and the air feeder.

14 Claims, 7 Drawing Sheets

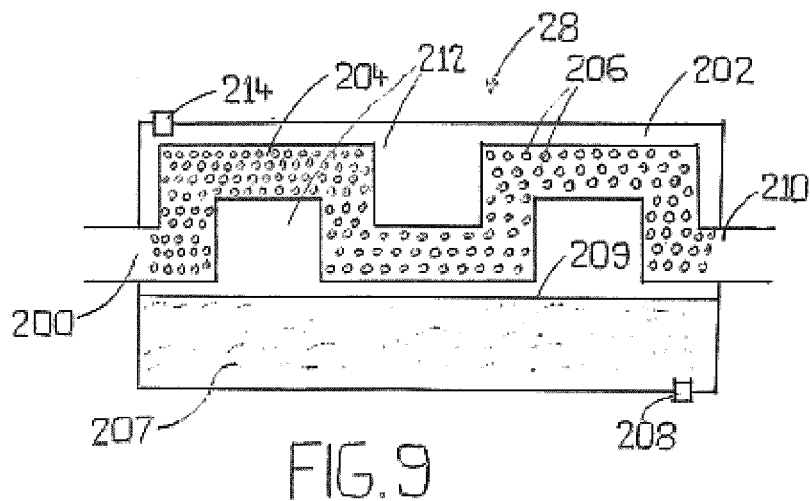
FIG. 9
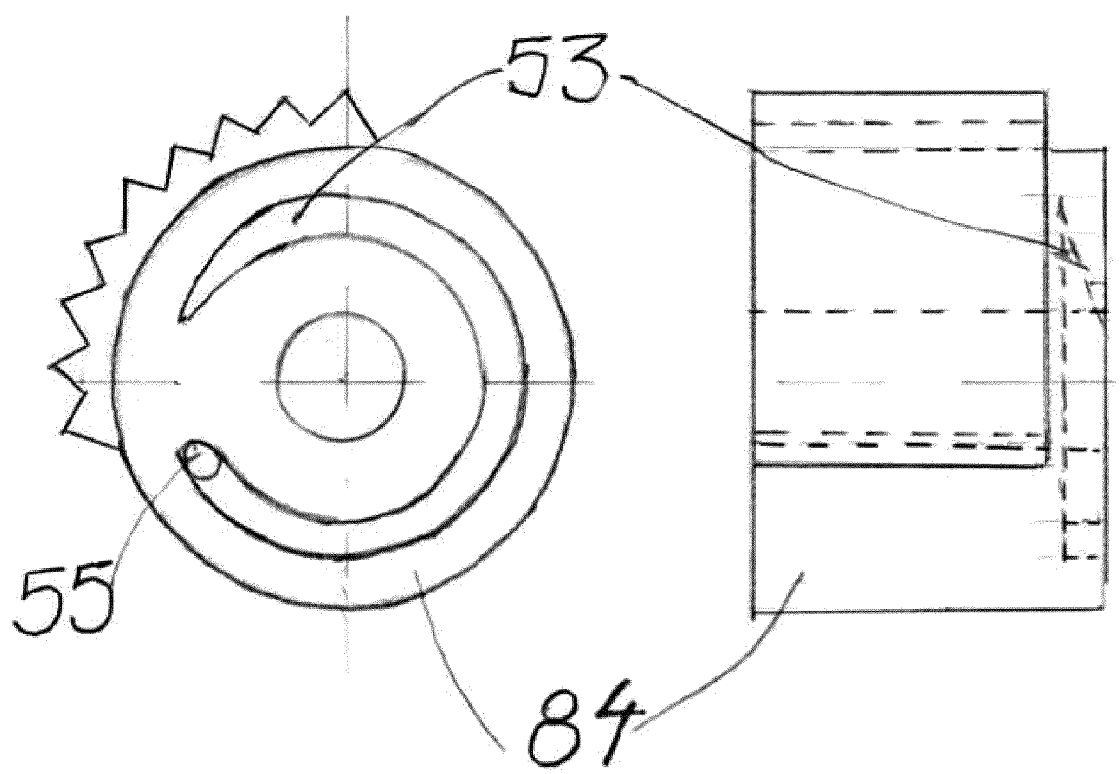

RACK AND PINION GEAR

TECHNICAL FIELD OF THE INVENTION

This invention relates to the making of crankshaft-free power generating piston-type engines. More particularly this invention is related to a power take off mechanism that performs the functions of transmitting of powers and changing powers as well.

BACKGROUND OF THE INVENTION

In the 21$^{st}$ century the pollution has become a serious problem. The engineering science has made efforts to make more environmentally-friendly engines so that would be fuel efficient and low pollutant. On the other hand the depletion of the fuel resources has directed the modern technology to seek other sources of energy. However, still there is a need for something new that may solve the today's concern. We need power making machineries that use less fuel to produce more power, and that are less pollutant.

At the prior art power making engines loss of energy also occurs. The crankshaft causes energy loss because the connecting rod transmits the power at an angle and it may start at any direction. So there is a need for a power take off device that reduces the friction and the opposing that the crankshaft causes; thus making the engine more energy sufficient. Moreover, there is a need to reduce the thermal energy loss of the gas inside the cylinder of the prior art external combustion engines. The prior art engines can not use unrefined fuel.

SUMMARY OF THE INVENTION

The present invention is directed to produce inexpensive, efficient, low-pollution internal and/or external combustion engines. In particular, the present invention is directed to a motor vehicle that utilizes an internal combustion engine that can use unrefined burnable products, these being gas or liquid; it is also directed to an external combustion engine which generates power by expansion of a non-burnable gas, it is further directed to an engine much smaller in size that can generate the same power as the prior art engines. Most importantly, our present invention is directed to an internal combustion engine that uses hydrogen as combustible gas.

The present invention comprises of: the Combustible Products Heater, the Power Take Off Mechanism and the Exhaust Cleaner. Each of these units may be used independently for particular applications, depending on the mission that one may have, or they may be combined together in order to work as a unit towards one common goal.

The following disclosure of the invention is only illustrative and does not intend to limit the scope of the invention. There may be embodiments other than the ones disclosed hereafter, other modifications and other ways of describing our invention, without departing from the scope of the main characteristics of our invention and its applications. We are providing the preferred embodiment of the present invention.

The Combustible Product Heater is used to warm up the combustible products which pass through a tube, made up of material that can resist high pressure and endure high temperatures. The electrical resistance, coated by electric insulation, passes through the tube in such a way that there is a hollow space between the electrical resistance and the tube coating for the combustible product to go through.

The Power Take Off Mechanism is a mechanism that changes the linear motion into rotational motion and vice versa. It comprises of a housing, in which the drive shaft is journaled by at least one suitable bearing in such a manner so as to allow free rotation of the drive shaft and at least one boundary flywheel with the centre of gravity non-axial is connected permanently coaxial with the drive shaft so as to rotate in unison with the drive shaft. At least one partially-toothed connecting rod is attached to the housing by at least two directives so as the partially-toothed connecting rod can move freely in reciprocating linear motion there through. At least one roller is permanently attached to the partly-toothed connecting rod by at least one fixed support so as to move in reciprocating linear motion in unison with the partly-toothed connecting rod. The at least partly-toothed connecting rod is put in gear with at least one party-toothed cylinder wheel which is arranged concentrically with the drive shaft in such a manner that it makes reciprocating angular motion independent to the axes of the drive shaft. At least one partly-toothed connecting rod attached via a connecting beam with at least one cylinder gear so as its axis to be perpendicular with the connecting beam and parallel to the axis of the drive shaft. At least one boundary flywheel with the centre of gravity non-axial is permanently attached to the drive shaft so as to rotate in unison. In the connecting beam are attached at least two rollers with parallel axes to the drive shaft; each refers to the inner edge of the leaf shaped groove. The connecting system connects the party-toothed cylinder wheel with the boundary flywheel with the centre of gravity non-axial. In the mechanism of the invention it is preferable that the connector in the connecting system is cylindrical and attached to the boundary flywheel with the centre of gravity non-axial via an elastic spring into a cylindrical aperture because the contact area between the party-toothed cylinder wheel and the boundary flywheel with the centre of gravity non-axial is big, thus enabling a smooth connection.

The connection is done in a half-cylindrical cavity where the connector disconnects when the roller is in the upper side disconnected by the boundary flywheel with the centre of gravity non-axial. The cylindrical connector resting in the aperture allows the boundary flywheel with the centre of gravity non-axial and the drive shaft rotate only in one direction that is preset for the present invention.

When the partly-toothed connecting rod is at the topmost position from the axes of the drive shaft, the boundary flywheel with the centre of gravity non-axial and the gearing cylinder are connected. During the downward stroke the partly-toothed connecting rod transmits straight-line tangentially against the party-toothed cylinder wheel at the meeting point. The party-toothed cylinder wheel starts the angular motion together with the boundary flywheel with the centre of gravity non-axial and the drive shaft simultaneously and at the same direction. Meanwhile, the rollers move in linear motion in unison with the partly-toothed connecting rod being inside the leaf shaped groove. Thus, the linear motion of the partly-toothed connecting rod turns into angular motion of the party-toothed cylinder wheel and rotational motion of the drive shaft and boundary flywheel with the centre of gravity non-axial simultaneously, in one axes.

Depending on the shape of the leaf groove, the connection of the party-toothed cylinder wheel and the boundary flywheel with the centre of gravity non-axial interrupts either before or at the time the partly-toothed connecting rod reaches the bottom point to the axis of the drive shaft. The rollers touch the points of the inner edge of the common segment of the leaf shaped groove and circular groove. At this time the party-toothed connecting rod and the rollers pause the linear motion, the party-toothed cylinder wheel pauses the angular motion while the rotating motion of the rulers continue, meanwhile the drive shaft and the boundary flywheel with the centre of gravity non-axial continue to rotate due to inertia until the rollers meet with the endpoint of the common segment of the leaf shaped groove and the circular groove.

During this time the rollers spin inside the common segment while the boundary flywheel with the centre of gravity non-axial rotates along with the leaf shaped groove and the circular groove, the partly-toothed connecting rod and the roller pause at the bottom end point of the reciprocating linear motion.

At the power request state, the double gate opens the respective leaf shaped groove. The drive shaft, the boundary flywheel with the centre of gravity non-axial continue to rotate due to inertia, causing the roller to go for linear motion, rolling inside the leaf shaped groove so as the respective roller touches the inner side of the groove and rolling in clockwise direction, and the other roller touches the other inner side of the groove rolling counterclockwise direction; the party-toothed connecting rod goes for the return stroke and the rollers go for return and rotational motion until they go back to the starting position, which is the topmost end point for the drive shaft that connects the party-toothed connecting rod with the roller. The reciprocating process repeats.

At the non power request state the double gate opens the circular groove. The drive shaft and the boundary flywheel with the centre of gravity non-axial continue to rotate due to inertia causing the respective roller to spin inside the circular groove in clock direction, which is the opposite direction of the rotation of the drive shaft, given that the drive shaft rotates counterclockwise; the partly-toothed connecting rod and the roller pause in relation to the linear motion, and the party-toothed cylinder wheel pauses in relation to the angular motion.

The Power Take Off Mechanism of our invention does the following: it changes the reciprocating linear motion into reciprocating angular motion and circular motion simultaneously, in one axes; it changes the reciprocal linear motion and the reciprocal angular motion simultaneously.

The exhaust Cleaner of our invention is used for cleaning the exhaust gases of an internal combustion engine. The exhaust tube is passes through a container which is filled with liquid up to a fixed level. The exhaust is sinuous inside the container and does not touch the liquid level. The exhaust blows out of the sinuous tube through the holes, which are aligned around the tube surface, and mixes with the liquid. The whirlpool caused by the blowing gas mixes the exhaust and the liquid. This mixing separates the impure components from the exhaust which enters back into the tube and then exits. This way of cleaning the exhaust reduces the air pollution because the impure exhaust goes to the ground through the liquid, instead of going into the air as gas.

The present invention is further directed to a motor vehicle. The motor vehicle of our invention comprises: —a Combustible Product Heater; —a Power Take Off Mechanism; —an Exhaust Cleaner; —an internal combustion engine, cylinder block, a header—Main Control Module, —Second Control Module, —Third Control Module. The internal combustion engine of the motor vehicle comprises a header, a cylinder block, a piston which is connected to a partly-toothed connected rod of the power take off mechanism. The combustible product gets warm at the Combustible product Heater during the time the piston is at the compressing stroke. At the time that the piston starts the expansion stroke the connection of the party-toothed cylinder wheel and the boundary flywheel with the centre of gravity non-axial is completed, and the injection valve opens. The injection is done when the piston is at the furthest point to the drive shaft and the heating of the combustible product is done previously. The pressure power causes the expansion stroke of the piston. The power produces is received by the partly-toothed connected rod, and transmitted to the party-toothed cylinder wheel and the roller simultaneously and these transmit this power to the drive shaft and to the boundary flywheel with the centre of gravity non-axial. The generator consumes the output energy of the drive shaft to generate heat for the Combustible Product Heater needed for the next cycle.

The exhaust valve opens before the expansion stroke is complete; then the air admission valve opens and at this moment the valves are both opened so as to have a complete cleaning of the exhaust products. The air enters at a preset velocity controlled by a ventilator or a device that does the like function. The cleaned air pushes the exhausts out of the cylinder through the exhaust valve. The piston enters in pause when the roller is at the common segment of the leaf shaped groove and the circular groove, while they keep rotating together with the boundary flywheel with the centre of gravity non-axial. The exhaust exiting from the exhaust valve through the exhaust tube and enter the liquid Exhaust Cleaner where there is done a separation of the products that pollute the environment. At the power request state, the double gate opens the leaf shaped groove. The drive shaft and the boundary flywheel with the centre of gravity non-axial rotate due to inertia, causing the roller to go for return linear motion, while the respective roller rolling clockwise inside the respective leaf shaped groove, which is opposite direction of the drive shaft, and the other roller rolling counterclockwise; the partly-toothed connecting rod pushes the piston for the return compression stroke; the party-toothed cylinder wheel goes for the return angular motion simultaneously until they go back to the starting position, which is the topmost end point for the piston and the roller. Meanwhile, the exhaust valve is closed, the cleaned exhaust enters the tube through the holes from the liquid, and then exit. The reciprocating cycle repeats. It is important to be understood that the drive shaft and the boundary flywheel with the centre of gravity non-axial rotate at all times.

During the piston pause time the air pushes the exhaust out of the cylinder through the exhaust valve; then the exhaust passes through the exhaust tube and enters the exhaust cleaner. The exhaust blows out of the tube through the holes. It mixes with the liquid. The exhaust valve closes while the admission valve opens. At the non-power request state the double gate opens the circular groove. The drive shaft and the boundary flywheel with the centre of gravity non axial keep rotating due to inertia causing the respective roller to spin inside the circular groove at the opposite direction of the rotation of the drive shaft, the partly-toothed connecting rod together with the piston pause in relation to the linear motion, and the party-toothed cylinder wheel pauses in relation to the angular motion. During the roller spins inside the circular groove, the valves cease running, being controlled by the Main Control Module. The Main Control Module interrupts the connection between the spark plug and the circuit; disconnects the generator from the Combustible Products Heater; interrupts the combustible product charge.

At the power request demand the Main Control Module resumes the combustible product charge; connects the generator with the Combustible Product Heater; connects the spark plug with the circuit; resumes the operation of the valves according to their processes; opens the leaf shaped groove by closing the circular groove, simultaneously.

The Second Control Module is connected with a frequency measurement device, which is attached to the drive shaft and the Main Control Module. The minimal running state of the motor vehicle is when the internal combustion engine is running and the motor vehicle is stalled. During the minimal running state, when the drive shaft rotates at a predetermined minimal frequency, the Second Control Module sends the power request demand signal to the Main Control Module. The Main Control Module responds to the power request signal disclosed above. When the drive shaft rotates at a predetermined maximal frequency, the Second Control Module sends the non-power request to the Main Control Module. The Main Control Module responds to the non-power request demand state as disclosed above.

When the Main Control Module receives the signal for power request demand needed, from outside, such as a rotating power using means, the Main Control Module interrupts the connection with the Second Control Module to perform the function needed for the power request demand state described above.

When the Main Control module receives the signal for non-power request demand, from outside, thus the minimal running state, the Main Control Module resumes the connection with the Second Control Module, so that later performs the functions needed for the minimal running state of the motor vehicle.

Upon the request to turn off the engine the Main Control Module disconnects from the Second Control Module and performs the functions of the non-power request state.

Upon the request to turn on the engine the Main Control Module connects with the Second Control Module and performs the functions needed for the minimal running state of the engine.

Based on the aforementioned disclosure the three elements of our invention; Combustible Product Heater; Power Take-Off Mechanism; Exhaust Cleaner; are connected by the piston, the cylinder and the Header is connected to the drive shaft and work together as a unit.

The present invention is further directed to an external combustion engine that uses the pressure of hot gas to cause the expansion stroke. Two heating chambers are disposed inside the parent heating chamber which is located in the Header. Hot heated gas coming from a suitable heating device placed adjacent the engine, passes through the parent heating chamber, thus heating the working gas inside the heating chambers to be ready for the expansion, via the walls of the heating chambers which are used here as heating exchange. The cold working gas enters the cylinder chamber through suitable inlet ports when the piston is at the bottom position to the axis of the drive shaft, at the pause time, while simultaneously pushing the warm expanded working gas out of the cylinder chamber, which then goes to the heat exchanger to get cold; then it goes to the ventilator and gets ready for the next cycle. With the reference to the operation of the power take-off mechanism of the foregoing disclosure, the piston goes for the upward stroke and causes the pressurized cold gas enter one of the heating chambers available, while the gas in the other heating chamber is already hot and ready to expand. Upon the completion of the upward stroke the hot working gas of the respective heating chamber enters the cylinder chamber through the respective valve causing the expansion stroke of the piston. Upon the completion of the expansion stroke, while the piston is at the pause time the cold working gas enters the cylinder and the cycle repeats. It is important to understand that we have two separate gases in two separate conditions, hot and cold, in different processes of cycle. The heating gas that passes through the parent heating chamber goes in a separate closed cycle from the cold working gas entering the cylinder, which goes in a closed cycle as well.

The present invention is further directed to an external combustion engine that utilizes chemical endothermic reactions and chemical exothermic reactions. The working gas used for expansion/compression stroke not only heats inside the heating chambers from the parent heating chamber, but it also has two properties: It starts a chemical endothermic reaction to absorb the remaining heat energy when the piston is at the bottom position of the axes of the drive shaft on the pause time, thus the chemical endothermic reaction is the cooling system for cooling working gas and the cylinder chamber, in this present invention and it must start a chemical exothermic reaction during the heating time inside the respective heating chamber.

The piston is at the bottom position to the axes of the drive shaft during the pause time, the working gas is cold. The valve of the respective heating chamber is open. During the upward stroke of the piston the gas pressurizes inside the respective heating chamber; the valve closes and the working gas is heating. The chemical endothermic reaction starts upon the completion of the expansion stroke causing the gas inside the cylinder to cool. The reciprocating process repeats.

The present invention is further directed to a compressor. The compression of our invention comprises cylinder block inside of which is attached a cylinder where a piston spins. Said piston is connected to the partly-toothed connecting rod in which at least two spinning rollers are permanently attached by a fixed support. The partly-toothed connecting rod is attached to a house by at least two seal assemblies so as to move freely in reciprocating linear motion. A drive shaft is permanently attached to at least one boundary flywheel with the centre of gravity non-axial so as to rotate in unison together. The drive shaft is attached to the house by at least one journal bearing so as to rotate freely. One leaf shaped groove and one circular groove that have a common segment and the spinning rollers are always inside either the leaf shaped groove or the circular groove, or in their common segment so as to move in reciprocating linear motion while the grooves rotate in unison with the boundary flywheel with the centre of gravity non-axial.

The present invention is directed to a motor vehicle windshield wiper mechanism. The party-toothed cylinder wheel is attached with a rod by a fixative. The length of the fixative is smaller than the inner length of the teeth of the party-toothed cylinder wheel. The windshield wiper moves in reciprocating angular motion. The windshield wiper mechanism of our invention cleans the windshield in a bigger angle, it is size efficient, and requires less running power.

It is accordingly the principal object of our invention to provide means of changing reciprocating linear motion into rotational motion through the cut by one side of the boundary flywheel with the centre of gravity non-axial with a leaf shaped groove where at least one roller attached through a fixative with the connecting rod of the piston spins, and vice versa, that minimizes the energy loss by minimizing the friction.

It is another object of our invention to provide an internal combustion engine that uses unrefined combustible products, for example base oil; and utilizes a more efficient power take off means. In said internal combustion engine the heating of the combustible product in the combustible product heater of the invention and the cleaning of the exhaust gases at the exhaust cleaner of the invention reduce the pollution, and make the said engine more power/energy efficient. The piston has neither the Top Dead Center Point nor it has the Bottom Dead Center Point because in the mechanism of our invention these points are pause times.

It is yet another object of our invention to provide an internal combustion engine that uses hydrogen as combustible product.

It is a further object of the present invention to provide an external combustion engine that utilizes chemical endothermic and exothermic reactions inside the cylinder that realizes the cooling of the gas. Said external combustion engine is energy efficient.

It is a further object of our invention to provide a motor vehicle that has a high power-weight ratio.

The aforementioned and other objects of the present invention will be more clearly understood by the following description of the invention and the accompanying drawing.

BRIEF DESCRIPTION OF THE DRAWINGS

FIG. 9 is a vertical axial cut of the exhaust cleaner 28.

DETAILED DESCRIPTION

Figure 1:
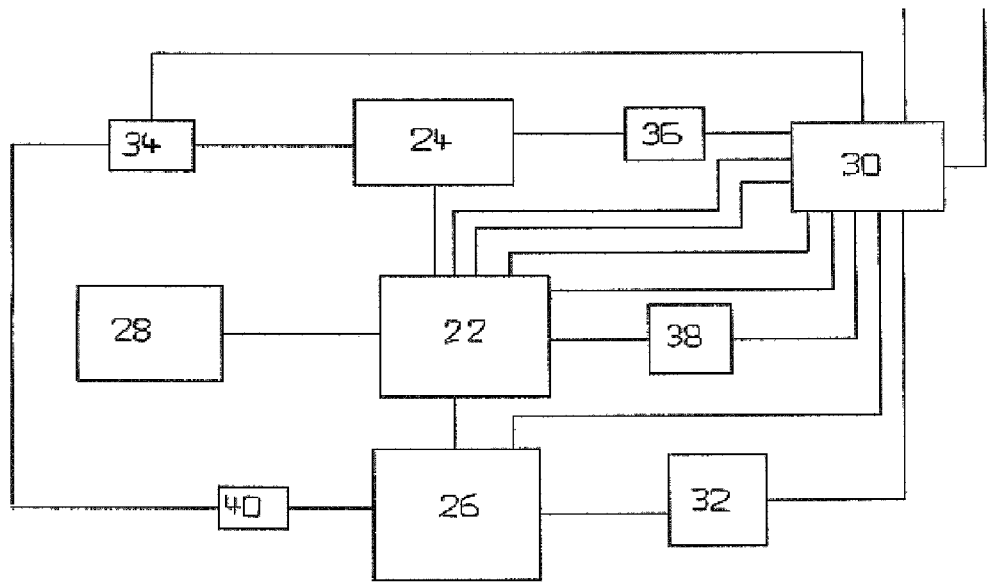
FIG. 1 is a schematic illustration of the motor vehicle 20 showing the connecting way of the main parts and its compounding systems.
Figure 2:
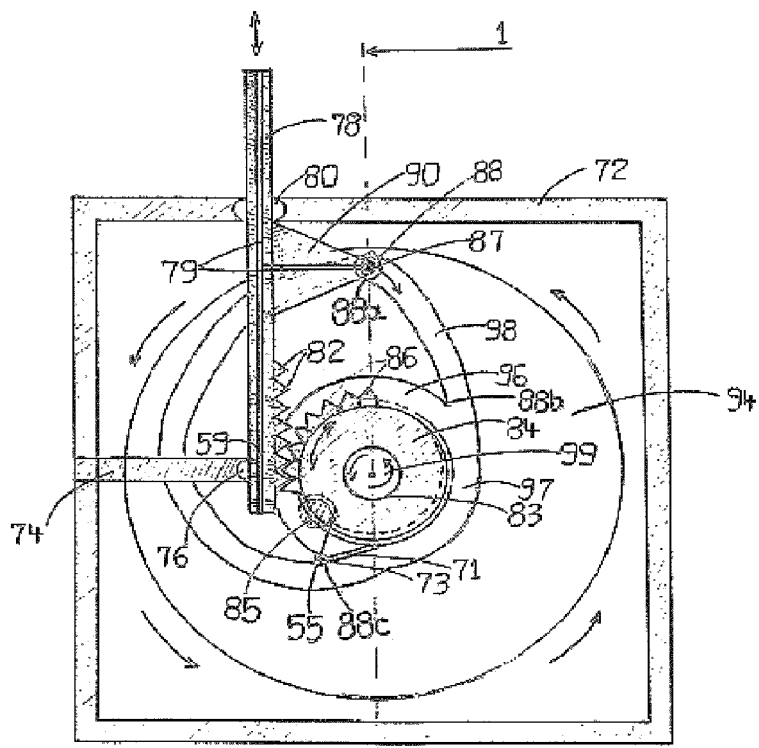
FIG. 2 is a front sectional vertical view of the mechanism 26 taken through plane 2-2 of FIG. 3.
Figure 3:
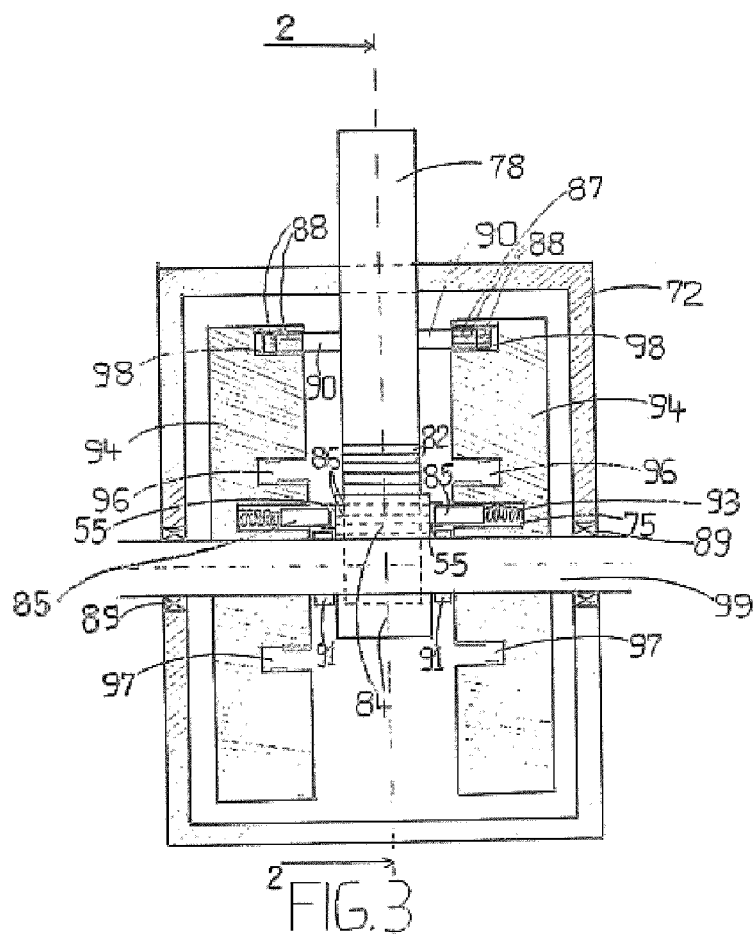
FIG. 3 is a sectional view of the mechanism 26 taken through plane 1-1 of FIG. 2.

One mode of performing the invention is discussed below. FIG. 1 schematically illustrates the configuration of a motor vehicle 20 in one embodiment of the invention. Motor vehicle 20 includes a power making internal combustible engine 22 of FIG. 5, which generates power by a piston which reciprocates inside a cylinder. The combustible product Heater 24 of FIG. 8 heats the burnable product before it is fed to the cylinder of engine 22. The function of the engine 22 is controlled by the main control module 30. The power take off mechanism 26 of FIG. 2 and FIG. 3, is connected to the partly-toothed connecting rod and converts the reciprocating straight-line forces generated by the piston into rotational force which then is transmitted to rotational power using machineries via the drive shaft 99. The exhaust cleaner 28 of FIG. 9, which is connected to engine 22, is used for cleaning the exhaust gases thereof.

The Main Control Module 30 is also connected to a Second Control Module 32 which controls the engine 22 during the minimal running state of the engine 22. The Main Control Module is further connected to a Third Control Module 34 which controls the energy flow to the heater 24, to the combustible product feeder 36; and the air needed in the air feeder 38, which feeds air into the cylinder at a particular speed depending on the mission of the engine. The generator 40 is connected to the third control module 34 and the mechanism 26. The third control module 34 is connected to the main control module 30 and to the fuel heater 24. The fuel feeder 38 is connected to the main control module 30 and the engine 22. The second control module 32 is connected to the main control module 30 and the mechanism of our invention 26.

Figure 5:
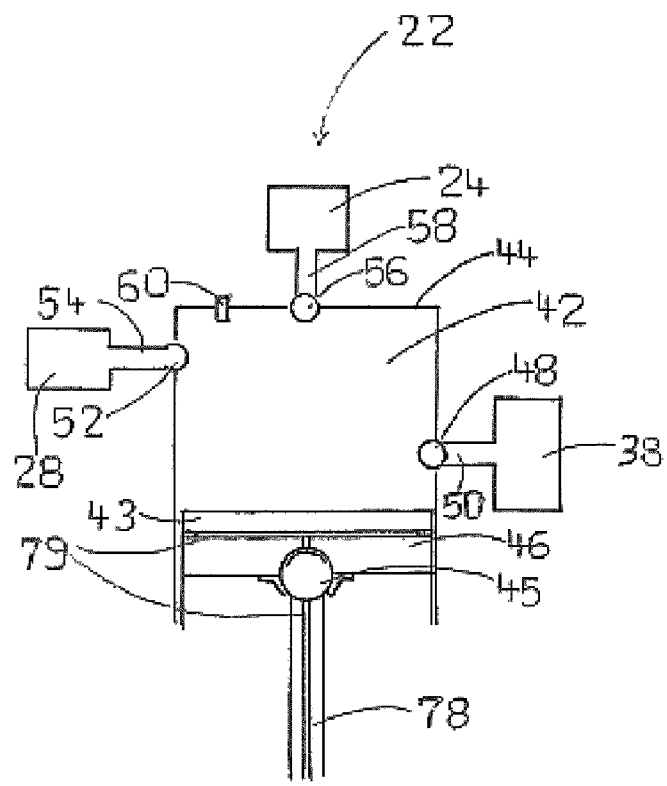
FIG. 5 is a schematic sectional view of the internal combustion engine 22.

With reference to FIG. 5 the internal combustion engine 22 of the present invention comprises a cylinder group 44, the cylinder chamber 42; a piston 46; the piston ring 43 which is lubricated by the lubricant transferred through the conduits 79; the admission valve 48, through which enters air in the diesel engines or air mixed with fuel in carburetor engines, exclusively, enters the cylinder chamber 42; the air admission tube 50 are connected to the air feeder 38. Special ceramic may be used for coating of the interior of the cylinder chamber 42 and the face of the piston 46, preferably. Other fitting material may be used as well. The partly-toothed connecting rod 78, referring to FIG. 5 is attached to the piston 46 by ball joints 45 to distribute the compression forces so that the partly-toothed connecting rod 78 slides unhampered and does not bend.

The engine 22 further comprises the exhausting valve 52 through which the exhaust gases exit the cylinder chamber 42; the exhausting valve 52 is connected to the exhaust cleaner 28 through the exhaust tube 54; the injection valve 56 which is disposed at cylinder header 44 and connected to the fuel heater 24 through the pressure tube 58; spark plug 60 connected in the cylinder header 44. The injection valve 56, admission valve 48, and the exhaust valve 52 are conventional and need not be disclosed further here. The internal combustion engine of our invention is at minimum a two-stroke power engine.

Figure 8:
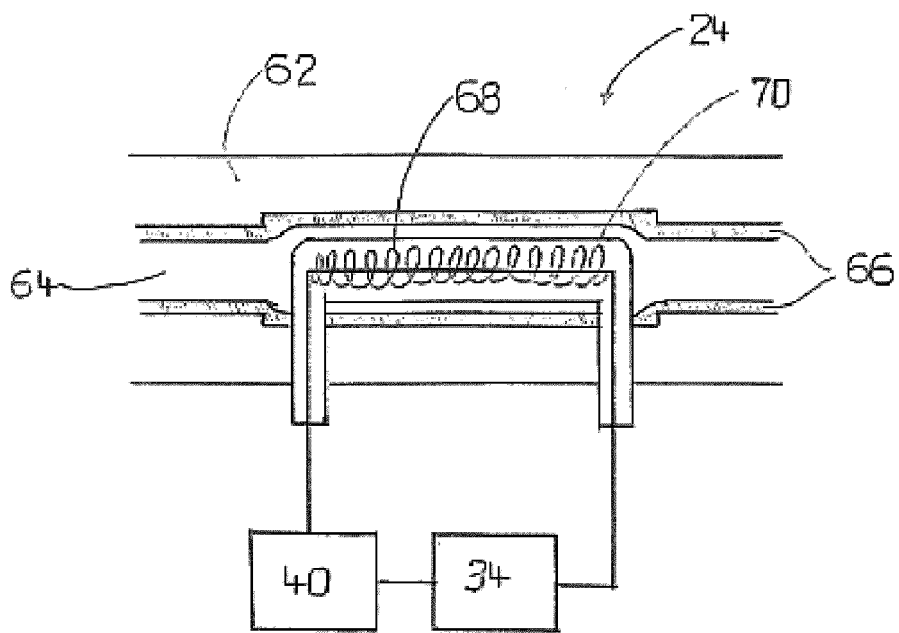
FIG. 8 is a vertical axial cut of the fuel heater 24.
Figure 10:
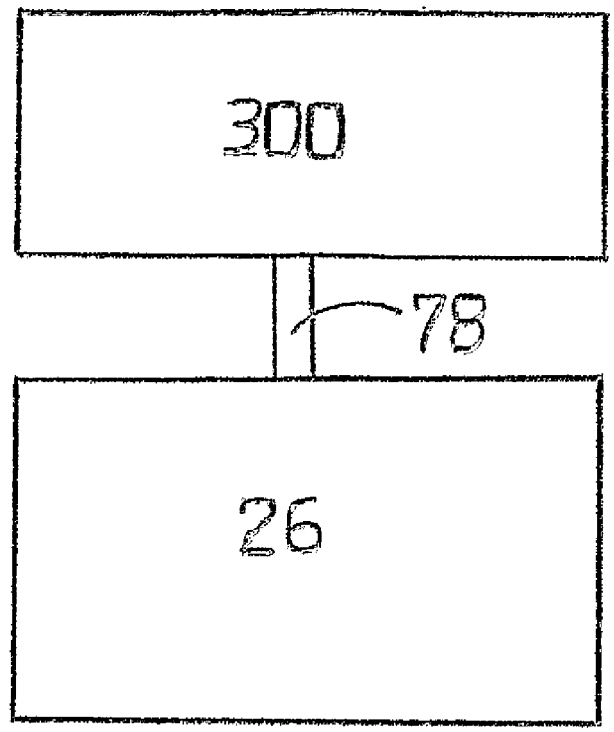
FIG. 10 illustrates the slope of the partially-toothed cylinder wheel 84.

With reference to FIG. 8 the fuel heater 24 comprises a pressure tube 62, build by a material that can resist high pressures and endure predetermined temperatures; the fuel duck 64 through which the combustible product passes after it has experienced high pressure powers, much bigger that the top area of the engine cylinder at the time the piston 46 is at the top position from the axes of the drive shaft 99. The thermal isolating coating 66 around the fuel duck 64 resists high pressure and does not allow any heat transmission.

The electrical resistance 68, suitable for the type of the engine, burnable products, etc, turns the electric current energy into thermal energy which heats the burnable products that enter the cylinder chamber 42, and causes the burn of the combustible product. This is preferred for our invention; other suitable methods may be used as one may desire. The electric insulation 70 does not allow contact of the electric resistance 68 with the pressure tube 62 and the combustible product used. The electric resistance 68 which is coated by the electric insulation 70 runs coaxially through the tube 62. The diameter of the fuel duck 64 is bigger than the diameter of the electric insulator 70, thus leaving a hollow space between the insulator 70 and the thermal insulating coating 66 of the interior tube 62. The electric resistance 68 is connected to the generator 40 and the third control module 34.

The combustible product heater 24 is used for heating the combustible products before they enter the cylinder chamber 42. This is done when the combustible product passes through the hollow space of the fuel duck 64 and touches the hot surface of the electric insulator 70.

When an engine uses base oil or unrefined gas, the electric resistance 68 may be connected with the third control module 34, along with the main control module 30, which can control the heating of the resistance 68 before the engine turns on.

With reference to FIG. 2 and FIG. 3, the power take off mechanism 26 of the present invention comprises a housing 72 in which there is an opening for placement of a fastening device 74, at the end of which there is a seal assembly 76. The fastening device 74 and the seal assembly 76 are used for attaching the partially-toothed connecting rod 78 to the housing 72 so as it can freely make linear reciprocating movement through the seal assembly 76. The seal assembly 76 may take certain shapes that fit the shape of the partially-toothed connecting rod 78 which may have different shapes, but the preferred shape is circular. The partially-toothed connecting rod 78 is connected to the housing 72 also by another seal assembly 80, which may be shaped to fit the shape of the partially-toothed connecting rod 78. The seal assembly 80 and the sea assembly 76 of the fastening device 74 make the connection of the partially-toothed connecting rod 78 with the housing 72, so as the partially-toothed connecting rod 78 is able to make the reciprocating motion, and hold the partially-toothed connecting rod 78 in a manner that the latter not bend, break or jam. The teeth 82 of the partially-toothed connecting rod 78 put the latter in gear with a partially-toothed cylinder wheel 84 by the teeth 86 of the partially-toothed cylinder wheel 84.

At least one boundary flywheel with the centre of gravity non-axial 94 is mounted to the drive shaft 99 so as to rotate in unison. The boundary flywheel with the centre of gravity non-axial 94 defines the limit points of the reciprocating linear motion of the partially-toothed connecting rod 78 and roller 88, thus the limit points of the reciprocating angular motion of the partially-toothed cylinder wheel 84. The preferred embodiment, as FIG. 3 shows, includes two boundary flywheel with the centre of gravity non-axial 94 and the partially-toothed connecting rod 78 and the partially-toothed cylinder wheel 84 are sandwiched there between. A circular groove 96, a leaf shaped groove 98, and a cylindrical aperture 75 are cut in each of the boundary flywheels with the centre of gravity non-axial 94. The leaf shaped groove 98 and the circular groove 96 intersect at the common segment 97. The circular groove 96 is concentric with the axis of the drive shaft 99. The leaf shaped groove 98 may take various shapes and the edges thereof may take various designs in order to suit the mission.

At least one roller 88 is permanently mounted in the partially-toothed connecting rod 78 by at least one fixed support stick 90 in such a way that the roller 88 paths inside a minimum of one of the leaf shaped groove 98 the circular groove 96, at all times while the leaf shaped groove 98 and the circular groove 96 rotate, and moving in unison with the partially-toothed connecting rod 78 simultaneously. The fixed support stick 90 is mounted in the partially-toothed connecting rod 78 by at least one screw.

The roller 88 preferably is made up of two coaxial rollers disposed in such a way that contacts the respective inner side of the leaf shaped groove 98 or the circular groove 96 at all times and simultaneously, depending on the mission of the mechanism 26, and they roll at opposite direction. Each one of the leaf shaped grooves 98, the circular grooves 96, and the two position gates 71 will include two respective grooves that are shifted on top of each other and with different depth as FIG. 3. The roller 88 may be any device that can perform the function of a roller. In accordance with the mission of the mechanism 26, the roller 88 may include two non touching rollers 88 disposed parallel to each other and in a line parallel so as they touch the inner side of the leaf shaped groove 98 and the circular groove 96 simultaneously. However, roller 88 may also be any sliding means, sliding through the inner or outer edge interior of the leaf shaped groove 98 or circular groove 96. The lubrication of the roller 88 is achieved through holes in the roller 88, of the drive shaft 87. The lubricant is transferred by conduits 79 that goes through the inside partially-toothed connecting rod 78 and is used to lubricate the teeth 82 of the partially-toothed connecting rod 78, and the teeth 86 of the partially-toothed cylinder wheel 84 as well. The valve 59 disposed in conduits 79 inside the partially-toothed connecting rod 78 is used for letting the lubricant only in one direction through conduits 79.

The drive shaft 99 is journaled with the housing through at least one journal bearing 89, FIG. 3, so as to rotate there through.

The drive shaft 99 is attached coaxially with the partially-toothed cylinder wheel 84, which has a cylindrical hole 83 that has a smaller diameter than the diameter of the drive shaft 99 so as to let the drive shaft 99 to rotate independently from the partially-toothed cylinder wheel 84.

The partially-toothed cylinder wheel 84 includes the teeth 86 and a flat cylindrical segment. The teeth of the partially-toothed cylinder wheel 84 are put in gear with the teeth 82 of the partially-toothed connecting rod 78 and this makes the changing of the reciprocating linear motion of the partially-toothed connecting rod 78 into angular circular motion of the partially-toothed cylinder wheel 84, the partially-toothed connecting rod 78 is tangent with the partially-toothed cylinder wheel 84 at the meeting points and in perpendicular planes. The direction of the fastening device 74 is perpendicular to the axes of the drive shaft 99, at the meeting points of the teeth 82 of the partially-toothed connecting rod 78 and the teeth 86 of the partially-toothed cylinder wheel 84.

The partially-toothed cylinder wheel 84 makes angular reciprocating movements which are independent of the rotations of the drive shaft 99. Thus the partially-toothed cylinder wheel 84 rotates at the same direction with the drive shaft 99, or opposite direction of the drive shaft 99.

A thrust washer 91 is positioned between the partially-toothed cylinder wheel 84 and each one of the boundary flywheel with the centre of gravity non-axial 94.

With reference to FIG. 3 our preferred connecting system is controlled by a spring 93 and comprises a preferred cylindrical connector 85, which stands on the elastic spring 93, with a suitable elastic ratio. The elastic spring 93 controls the timing that it takes for the connection of the boundary flywheel with the centre of gravity non-axial 94 with the partially-toothed cylinder wheel 84 via the movement of the cylindrical connector 85. Both the cylindrical connector 85 and the elastic spring 93 are placed in the boundary flywheel with the centre of gravity non-axial 94 through the cylindrical aperture 75. The connecting ways may vary. The controlling of the cylindrical connector 85 may be accomplished by other conventional ways, such as, magnetic field, air, etc.

The cylindrical connector 85 may have various shapes, but the preferred shape is circular. We prefer cylindrical form because the contacting surface is greater, thus giving a shorter time for the connection of the boundary flywheel with the centre of gravity non-axial 94 with the partially-toothed cylinder wheel 84.

The half-cylindrical aperture 55 is in a position where the connector 85 rests for a predetermined period of time during which the boundary flywheel with the centre of gravity non-axial 94 is connected with the partially-toothed cylinder wheel 84. The connection of the boundary flywheel with the centre of gravity non-axial 94 with the partially-toothed cylinder wheel 84 does not depend only on the cylindrical connector 85, it also depends on the common performance of the elements of our invention. The half-cylindrical cavity 55 as illustrated in FIG. 3, is cut in and tapers off around the partially-toothed cylinder wheel 84 so as the connection is done smoothly.

A two-position gate 71, which either opens the leaf shaped groove 98 by closing the circular groove 96, or opens the circular groove 96 and closes the leaf shaped groove 98, depending on the request, in order to determine the motion of the roller 88.

The two-position gate 71 is disposed at one of the common segment 97, which depends on the direction of the rotation of the boundary flywheel with the centre of gravity non-axial 94. It makes an angular reciprocating motion around an axis 73, which is located at the last intersection point of the leaf shaped groove 98 and the circular groove 96 in order for the two-position gate 71 to perform the needed action.

The boundary flywheel with the centre of gravity non-axial 94 is perpendicular to the axes of the drive shaft 99 and the axes of the roller 88. The axes of the drive shaft 99 is at all times parallel to the axes of the roller 88.

The mechanism 26 of our invention does the following: it covers the reciprocating linear motion into reciprocating angular motion and rotational simultaneously, in the same axes; it converts the reciprocating angular motion into reciprocating linear motion and rotational simultaneously in the same axes, in the same way as converting the reciprocating linear motion into reciprocating angular motion simultaneously.

The detailed disclosure of the preferred embodiment of the present mechanism discloses two boundary flywheels with the centre of gravity non-axial 94. There may be disposed more than two boundary flywheel with the centre of gravity non-axial 94 along the drive shaft 99, or just only one; more than one partially-toothed cylinder wheel 84; more than one roller 88; more than one circular groove 96 and more than one leaf shaped groove 98, more than one partially-toothed connecting rod 78. The configuration will vary for various applications and various missions. In other applications, at least one leaf shaped groove 98 and/or one circular groove 96 may be cut in both sides of the boundary flywheels with the centre of gravity non-axial 94 and the combination of the above elements may be set up according to the application. However, there may be other means that can be used as boundary means instead of a boundary flywheel with the centre of gravity non-axial 94.

Another configuration will be if we take away the partially-toothed cylinder wheel 84, the connector 85, the teeth 82 of the partially-toothed connecting rod 78, than the modified mechanism converts the reciprocating linear motion into circular motion and vice-versa.

Another embodiment of the present mechanism is when a satellite-planetary-system, known to prior art, is disposed between the partially-toothed cylinder wheel 84 and the connecting system. This will secure the upward motion of the partially-toothed connecting rod 78 and roller 88 are needed forces in high values.

The leaf shaped groove 98, the circular groove 96, the roller 88, and the boundary flywheels with the centre of gravity non-axial 94 may be intended in order to suit various missions for various applications. The principle of configuration and the principle of function of this embodiment are the same as the principles of the aforementioned embodiment.

The operation of mechanism 26. The roller 88 is permanently attached by a fixed stick support 90 on the partially-toothed connecting rod 78 and does reciprocating linear motion together with the partially-toothed connecting rod 78. Simultaneously, while the boundary flywheel with the centre of gravity non-axial 94 together with the leaf shaped groove 98 and the circular groove 96 rotate, thus guiding the roller 88 to path inside therein, so the latter can do the reciprocating linear motion. It should be understood that the roller 88 moves in linear motion by passing inside the leaf shaped groove 98, which on the other hand makes this movement possible by rotating itself, simultaneously.

With reference to FIG. 2 the point 88a on the leaf shaped groove 98 is the starting point of the cyclical process and it is the farthest point from the axes of the drive shaft 99. The point 88a and the point 88b define the boundary of the linear path of the roller 88. The point 88b of the leaf shaped groove 98, is the closest point from the axes of the drive shaft 99, and the first and the first internal common point of the leaf shaped groove with the circular groove 96.

During the following description we will refer to the aforementioned points in order to identify the position of the roller 88 during the rolling linear motion.

FIG. 2 shows the position of the roller 88 at the point 88a. When the partially-toothed connecting rod 78 and the roller 88 start the linear motion towards the point 88b, the partially-toothed cylinder wheel 84 starts the angular motion, rotating at the same direction with the direction of the rotation of the drive shaft 99, and the boundary flywheel with the centre of gravity non-axial 94. We take the counterclockwise direction for our description; it may be set to either direction. At the same moment, the cylindrical connector 85 connects the partially-toothed cylinder wheel 84 with the flywheels with the centre of gravity non-axial 94 and the drive shaft 99. This connection makes the drive shaft 99 and the boundary flywheel with the centre of gravity non-axial 94 rotate at the same direction as the direction of the rotation of the partially-toothed cylinder wheel 84. At the end of the connection of the partially-toothed cylinder wheel 84 with the boundary flywheel with the centre of gravity non-axial 94 and the drive shaft 99, the roller may not touch the inner edge of the leaf shaped groove 98. This causes the roller 88 to rotate around its own axes 87. The roller 88 does the linear motion from point 88a to point 88b as well. All that is mentioned above continues until the roller 88 meets the point 88b. Note that the roller 88 and the leaf shaped groove 98 are moving on a linear motion and a circular motion respectively, simultaneously.

Depending on the shape of the leaf shaped groove 98, the connection of the partially-toothed cylinder wheel 84 and the boundary flywheel with the centre of gravity non-axial 94 interrupts either before or at the time when the roller meets with the point 88b and touches with the inner edging of the common segment 97 of the leaf shaped groove 98 and the circular groove 96 simultaneously.

At the time the roller 88 meets with the point 88b, the roller 88 and the stop their linear motions. Concurrently, the partially-toothed cylinder wheel 84 stops its angular motion, because is connected with the partially-toothed connecting rod 78 through the rod teeth 82 and the teeth 86 of the partially-toothed cylinder wheel 84.

Note that the partially-toothed connecting rod 78 is tangent with the partially-toothed cylinder wheel 84 at the meeting point.

While the roller 88, the partially-toothed connecting rod 78, and the partially-toothed cylinder wheel 84 are at pause, the boundary flywheel with the centre of gravity non-axial 94, the drive shaft 99, and the cylindrical connector 85 continue to rotate because the inertia forces. Meanwhile, simultaneously the cylindrical connector 85 climbs up the circular slope 53 along the flat cylindrical segment of the partially-toothed cylinder wheel 84 which starts from the half-cylindrical cavity 55 pushing the elastic spring inside the cylindrical aperture 75 on the boundary flywheel with the centre of gravity non-axial 94.

Note that the boundary flywheel with the centre of gravity non-axial 94 and the drive shaft 99 rotate at all time during the operation, that is, they never stop or change direction. They always rotate at the same direction.

The roller 88, the partially-toothed cylinder wheel 84, and the partially-toothed connecting rod 78 stay at pause since the time the roller 88 meets with the point 88b and touches the inner edge of the common segment 97 until it meets the point 88c, while the boundary flywheel with the centre of gravity non-axial 94 and the drive shaft 99 rotate. The point 88c is the last inner point of the leaf shaped groove 98 and the circular groove 96. Thus, the point 88b and the point 88c are the endpoints of the inner edge of the common segment 97.

While the common segment 97 rotates and the roller 88 spins therein from the point 88b to the point 88c, the roller 88 may touch the inner edgings of the common segment 97, that is the width of the groove at this segment may be a little bigger than the diameter of the roller 88. However, in the applications when the roller 88 includes two rollers, then they contact the inner edge interior of the respective leaf shaped groove 98 and circular groove 96 in a continuous way.

Beyond the point 88c, the boundary flywheel with the centre of gravity non-axial 94, the leaf shaped groove 98 and the drive shaft 99 continue to rotate in the same direction, while the points of the inner edge of the leaf shaped groove 98 are in contact with the outer surface of the roller 88, making the latter to move around its axes 97 and move in linear motion toward the point 88a concurrently. Meanwhile, the cylindrical connector 85 rotates along the with boundary flywheel with the centre of gravity non-axial 94 still moving in the outer slope 53 of the partially-toothed cylinder wheel 84 until the aperture half-cylindrical 55.

During this time, the roller rotates around its axis which is parallel to the axes of the drive shaft, in opposite direction of the drove shaft 99 and the boundary flywheel with the centre of gravity non-axial 94.

The roller 88 being permanently mounted to the partially-toothed connecting rod 78 by the fixed support 90 causes the partially-toothed connecting rod 78 to start the reciprocating linear motion. On the other hand partially-toothed connecting rod 78 being connected to the partially-toothed cylinder wheel 84 to the teeth, cause the return of the reciprocating angular motion of the partially-toothed cylinder wheel 84 at the opposite direction of the rotation of the drive shaft 99.

Beyond the point 88c, the drive shaft 99 continues to rotate at the same direction with the boundary flywheel with the centre of gravity non-axial 94 together with the leaf shaped groove 98 and the circular groove 96. Meantime, the partially-toothed connecting rod 78 together with the roller 88 continue the linear reciprocating motion and the partially-toothed cylinder wheel 84 continues the reciprocating angular motion at the opposite direction of the rotation of the drive shaft 99 until the roller 88 meets the point 88a. When the roller 88 is at the point 88a, the cylindrical connector 85 completes climbing up on the outer slope 53 compressing the spring 93 to a maximum. The elastic spring 93 pushes the cylindrical connector 85 back into the half-cylindrical cavity 55 where it rests during the connection time. Beyond the point 88a the reciprocating process repeats.

Note that the controlling cylindrical connector 85, which makes the connection of the partially-toothed cylinder wheel 84 with the boundary flywheel with the centre of gravity non-axial 94 and the drive shaft 99 upon starting toward motion to the nearest point to the axes of the drive shaft 99 the partially-toothed connecting rod 78 and the roller 88, at the time of the connection do not allow the rotation of the boundary flywheel with the centre of gravity non-axial 94, and the drive shaft 99 at the opposite direction of the one determined at the time of build of our mechanism 26. That is, the cylindrical connector 85 defines the unity of the direction of the drive shaft 99 and of the boundary flywheel with the centre of gravity non-axial 94 especially when high value forces are present.

The drive shaft 99 may be used as a power transmitting means from the partially-toothed connecting rod 78 while the partially-toothed connecting rod 78 moves at the linear motion together with the roller 88 during the time the roller 88 moves in linear motion from the point 88a to the point 88b by the use of the partially-toothed cylinder wheel 84, the cylindrical connector 85 and the boundary flywheel with the centre of gravity non-axial 94. The rotating power transmitted to the boundary flywheel with the centre of gravity non-axial 94 and the drive shaft 99 may be used by rotating power using machineries, these being either for stationary or moving mission, for example, being sent to rotate the wheels of motor vehicles. Part of the rotating energy is sent the partially-toothed cylinder wheel 84 and to the partially-toothed connecting rod 78 by the roller 88, when the roller 88 does the reciprocating linear motion guided by the leaf shaped groove 98 from the point 88c to the point 88a, while the leaf shaped groove 98 rotates.

Note that the connection of the partially-toothed cylinder wheel 84 with the boundary flywheel with the centre of gravity non-axial 94 and the drove shaft 99 is done smoothly.

Meanwhile, the rotating power of the boundary flywheel with the centre of gravity non-axial 94 is used by the mechanism of the present invention 26 to secure reciprocating linear motion from the point 88c to the point 88a of the roller 88 that causes the reciprocating linear motion of the partially-toothed connecting rod 78.

With reference to FIG. 2 the gate 71 has two positions, the position 71d that closes the circular groove 96 leaving the leaf shaped groove 98 open, and the position 71f that closes the leaf shaped groove 98 leaving the circular groove 96 open. The gate 71 stays at the position 71d during the procedure of the above mentioned.

When the gate 71 is placed at the position 71f, the circular groove 96 is open and he leaf shaped groove 98 is closed. Referring to the above teaching when the boundary flywheel with the centre of gravity non-axial 94 rotates and the circular groove 96 is open, the roller 88 meets with the interior of the circular groove 96. While the roller 88 paths into the circular groove 96 it only rotates around its axis and pausing the linear motion. This causes the partially-toothed connecting rod 78 together with the partially-toothed cylinder wheel 84 stay static as the circular rove 96 allows the roller 88 to rotate touching the inner edge of the circular groove 96.

Note that boundary flywheel with the centre of gravity non-axial 94 together with the leaf groove 98 and the circular groove 96, and the drive shaft 99 rotate at the given direction while the partially-toothed connecting rod 78 together with the roller 88 are static and the roller 88 rolls at the opposite direction with direction with the drive shaft 99. During this, the roller 88 touches the inner edge of the circular groove 96. Meanwhile the cylindrical connector 85 rotates along the boundary flywheel with the centre of gravity non-axial 94 climbing up boundary flywheel with the centre of gravity non-axial 94 the circular slope 53 and climbing down into the half cylindrical cavity 55 the same way as the aforementioned teaching but this time the cylindrical connector 85 rotates along with the and the drive shaft 99 and does not perform the connecting function. The mechanism runs at this state as long as the gate 71 stays at the position 71f until it receives the signal to change position.

The above overall teaching shows only one configuration of the leaf shaped groove 98, circular groove 96, and the common segment 97. Different configurations are made according to different missions given to the mechanism of the invention 26, making it possible for use in various applications.

Moreover, the mechanism 26 will have another configuration if the circular groove 96 in the boundary flywheel with the centre of gravity non-axial 94 and the double gate 71 are not present. Thus the roller 88 paths inside the leaf shaped groove 98. Therefore the partially-toothed connecting rod 78 and the roller 88 will still have a pause time when the roller 88 paths inside the respective fragments of the leaf shaped groove 98, but not a full pause time. The present mechanism 26 will still perform the above operations. Note that the center of the rotation of the points of the leaf groove 98 and of the circular groove 96 are the same as the center of the partially-toothed cylinder wheel 84 which is at the axis of the drive shaft 99.

We will call the ratio of the rotated angle that the boundary flywheel with the centre of gravity non-axial 94 makes during the time the cylindrical connector 85 keeps partially-toothed cylinder wheel 84 connected with the boundary flywheel with the centre of gravity non-axial 94, to the angle of a complete revolution (360 degrees] the coefficient of the invention. The coefficient of the invention can take the maximum value equal to one per every complete revolution. The mechanism of the invention may be build as such that the coefficient as small values as the ones close to zero. This depends of the mission of the application.

The coefficient of the present invention will be used to determine all of the following: the length of the teethed-arc segment of the partially-toothed cylinder wheel 84; the length of the teethed segment of the partially-toothed connecting rod 78; the diameter of the partially-toothed cylinder wheel 84; the minimal radius of the boundary flywheel with the centre of gravity non-axial 94. All of the above elements are predetermine for a given mission of the invention.

One object of the present invention is that it minimizes power loss, because the direction of the force of the partially-toothed connecting rod 78 passes tangent onto the meeting points with the partially-toothed cylinder wheel 84 and is the same as the direction of the rotation of the partially-toothed cylinder wheel 84.

Yet another configuration of the present mechanism is when the connecting system is taken away. This configuration may be applied in other application for particular missions, such as for changing rotation motion into reciprocating linear motion and the linear reciprocating motion into reciprocating angular rotation in the same axes. Rotation motion of the drive shaft 99 and boundary flywheel with the centre of gravity non-axial 94 is activated, when the roller 88 and the partially-toothed connecting rod 78 are at the top end position. The roller 88 paths inside the leaf shaped grove 98 transmitting rotation motion of the boundary flywheel with the centre of gravity non-axial 94 and the drive shaft 99 into linear and rotational motion of the roller 88 and linear motion of the partially-toothed connecting rod 78, and simultaneously reciprocating angular motion of the partially-toothed cylinder wheel 84. When the roller 88 paths inside the common segment 97 of the grooves, linear motion of the partially-toothed connecting rod 78 and the roller 88 pauses, while the rotational motion of the drive shaft 99 and boundary flywheel with the centre of gravity non-axial 94 continues simultaneously, the motion of the roller 88 continues as well.

The linear motion of the partially-toothed connecting rod 78 and roller 88 stop, when the roller 88 paths inside the circular groove 96, while the rotational motion of the drive shaft 99 and boundary flywheel with the centre of gravity non-axial 94 continue, simultaneously. When the roller 88 resumes path inside the leaf shaped groove 98, rotation motion of drive shaft 99 and boundary flywheel with the centre of gravity non-axial 94 continue, causing starting of return linear motion of partially-toothed connecting rod 78 and roller 88, and starting of angular motion of partially-toothed cylinder wheel 84. While roller 88 paths inside respective common segment 97 of the leaf shaped groove 98 the linear motion of the partially-toothed connecting rod 78 and roller 88 and the angular motion of partially-toothed cylinder wheel 84 pause, while the rotating motion of drive shaft 99 and boundary flywheel with the centre of gravity non-axial 94 continue simultaneously until roller 88 and partially-toothed connecting rod 78 and partially-toothed cylinder wheel 84 reach the initial position. Thus, the rotating motion of the drive shaft 99 and boundary flywheel with the centre of gravity non-axial 94 change into reciprocating linear motion of partially-toothed connecting rod 78 and roller 88 and reciprocating angular motion of partially-toothed cylinder wheel 84, simultaneously.

With reference to FIG. 9, the exhaust gas cleaner 28 relates to the exhausting system of the motor vehicle 20. It comprises of a container 202, which may take various angular shapes. Entrance tube 200 through which the exhaust exiting the engine cylinder enter the tube 204. Tube 204 is sinuous inside the container 202 and is permanently attached to the container 202. Holes 206 are aligned around the tube 204, the diameter of which depends on the kind of the burnable products used by the engine, and the coefficient of the invention mentioned on the above teaching.

The present invention further comprises of the liquid 207 which is used to clean the exhaust gases that exit in the environment. Liquid 207 may be water or dilated water. The inlet valve 214 lets the liquid 207 into the container 202. The level 209 of the liquid 207 is predetermined. There is a hollow space 212 around the tube 204 inside the container 202. The valve 208 is used for draining the liquid 207. The exit tube 210 through which the clean exhaust gases exit the tube 204.

The exhaust enter the tube 204 through entrance tube 200. The shape of the tube 204 makes it possible that the exhaust to blow out of the tube 204 through the holes 206 into the liquid 207. The pressure of the incoming gas causes whirlpool, which makes the mixing of the exhaust, during this process the impure compounds are separated and remain in liquid 207, then the cleaned gas reenter in the tube 204 through the holes 206 then it exits through the exit tube 210.

On the other hand, because the exhaust contains water matter, during the mixing the level 209 rises. The liquid 207 above the level 209 enter the tube 204 through the holes 206 and then exits through the exit tube 210.

The present invention can also function if one wishes to use a closed cycle for cleaning of the liquid.

The exhaust through our invention reduces the air pollution because of the exit of the clean exhaust. This new muffler is a better silencer and the exhaust exits without impediment.

Operation of the Motor Vehicle

With reference of FIG. 2, the starting point of the reciprocating process of the engine is when the roller 88 meets with the point 88a, which is the furthest point from the axes of the drive shaft 99. The cylindrical connector 85 completes the connection of the partially-toothed cylinder wheel 84 with the boundary flywheel with the centre of gravity non-axial 94. With reference to FIG. 5, the injector 56, guided by the main control module 30, injects the warm combustible product prepared at the fuel heater 24 of FIG. 8, which is connected to the drive shaft 99 through the third control module 34. The injection may be done by two injectors 56. One injects the warm burnable products during power request state from outside and is controlled by the main control module 30, and the other injects fuel during minimal running state of engine 22, that means power request from within, and is controlled by the second control module 32. The combustible product goes to the heater 24 from the feeder 36 to get heated. The prepared combustible product is transported by the tube 58 from the heater 24 to the injector 56. The spark plug 60 ignites, causing the burning of the combustible product. The combustible compressed product may self burn in other applications. The pressure power pushes the piston 46 to start the first stroke. The piston 46 is connected with the partially-toothed connecting rod 78 through by ball joints 45. The power is transmitted from the piston 46 to the partially-toothed connecting rod 78, to the partially-toothed cylinder wheel 84, to the boundary flywheel with the centre of gravity non-axial 94 by the connector 85, and then to the drive shaft 99, and a part of the power is transmitted by the piston 46 to the partially-toothed connecting rod 78, to the fixed support 90, to the axes of the roller 88, to the leaf shaped groove 98 cut at leas by one side of the boundary flywheel with the centre of gravity non-axial 94, and to the drive shaft.

With reference to the aforementioned description of mechanism 26 of the invention of FIG. 2, when the roller 88 is approaching to the point 88b, controlled by the main controlled module 30, and the exhaust valve 52 opens to allow the exhaust to exit the cylinder 42, the admission valve opens as well, which is controlled too by the main controlled module 30. During the period of time when the roller 88 meets the common segment 97, which means from point 88b to point 88c, of the leaf shaped groove 98 and the circular groove 96 respectively, the partially-toothed cylinder wheel 84 is disconnected from boundary flywheel with the centre of gravity non-axial 94, they move independently of each other. The piston 46, the partially-toothed connecting rod 78, the partially-toothed cylinder wheel 84, the roller 88 pause, while the boundary flywheel with the centre of gravity non-axial 94 and the drive shaft 99 rotate. This is the pausing time of the piston 46 and its nearest position with the axes of the drive shaft. As soon as the roller 88 meets with the point 88b the air admission valve 48 opens.

During expansion stroke of the piston 46, the lubricant valve 59, the conduits 79 open. The lubricant enters the conduits 79, the teeth 82 of the partially-toothed connecting rod 78, then to the roller 88, and then to the piston ring 43, thus completing the lubrication of the cylinder.

The air feeder system 38 has already prepared the air to enter the cylinder 42 at a particular speed, as needed by the engine through the admission valve 48. The air pressure in the cylinder 42 cause the exit of the exhaust gases through the exhaust valve 52, and in the same time it helps to cool the cylinder 42. During the piston 46 pause time the air pushes the exhaust out of the cylinder 42 through the exhaust valve 52, then the exhaust pass in the tube 54 and enter the sinuous tube 204 of the exhaust 28 through the inlet tube 200 and then exits from the sinuous tube 204 through the holes 206, then mixes with the liquid 207 by the whirlpool caused of the blow. The exhaust valve 52 closes before the roller 88 meets the point 88c, them the air inside the cylinder 42 is ready for the starting of compression stroke. At the power request state, the two-position gate 71 gets the position 71d, controlled by the main control module 30, opening he leaf shaped grove 98. The roller 88 spins inside the leaf shaped groove 98, touching the inner side thereof. The compression stroke starts when the roller 88 starts linear motion from the point 88c to the point 88a.

During the compression into the cylinder 42, the cleaned exhaust reenters the sinuous tube 204 through the holes 206, then exits through the exit port 210.

Meanwhile the partially-toothed connecting rod 78 together with the piston 46 begins the return stroke along with the roller 88, thus causing the compression stroke in the cylinder 42. During the reciprocating motion of the piston 46, the generator consumes the energy of the drive shaft 99 to generate heat for the heater 24 needed for the next cycle. The pressure power is at maximum when the roller 88 meets with the point 88a, the reciprocating process starts all over.

Note that, the reciprocating motion of the piston 46, the process of the boundary flywheel with the centre of gravity non-axial 94, the partially-toothed cylinder wheel 84, and the drive shaft 99 of the aforementioned teaching mechanism 26 of our invention happens at the same way and same order as described here. Also note that the drive shaft 99 is always rotating at the same direction.

All of the above aforementioned motions happen when the two-position gate 71 is at position 71d.

When the main control module 30 receives the OFF signal that turns off the present engine, sends change position to the tow-position gate 71, which takes the position 71f opening the circular groove 96. The roller 88 rolls inside the circular groove 96 while the partially-toothed connecting rod 78, the piston 46, and partially-toothed cylinder wheel 84 pause for as long as the roller 88 spins inside the circular groove 96. This causes the piston 46 to pause while the boundary flywheel with the centre of gravity non-axial 94 and the drive haft 99 rotate. At the same time, the main control module 30 interrupts the function of the fuel feeder 36, signals the third control module 34 to interrupt the energy flow to the heater 24, interrupts the air feeder 38, stops the function of the admission valve 48, exhaust valve 52, and injector 56, spark plug 60. Meanwhile the main control module 30 interrupts the function of the second control module 32.

When the main control module 30 receives the ON signal that turns on the present engine, the gate 71 takes the position 71d opening the leaf shaped groove 98. The roller 88 paths inside the leaf shaped groove 98 and the functions of the above elements that the main control module 30 controls, resume function.

When the main control module 30 receives the non-power request state signal that means the present engine is at minimal running state, it communicates with the second control module 32, which stars functioning at this time. Upon the a preset maximal frequency of drive shaft 99 the second control module 32 signals the main control module 30 for the OFF request state, the main control module 30 runs upon the OFF request state disclosed above. The boundary flywheel with the centre of gravity non-axial 94 and the drive shaft 99 continue to rotate due to inertia forces until a preset minimal frequency. Upon the preset minimal frequency of the drive shaft 99 the second control module 32 signals the main control module 30 for the ON request state. The engine runs at the minimal state.

When the main control module 30 receives the power request state signal disconnects communication with the second control module 32. The intermittent process happens as is explained above.

While the roller 88 spins inside the circular groove 96, the function of the admission valve 48 and the exhaust valve 52, spar plug 60, and the fuel heater 24 are at pause. This is controlled by the main control module 30, which can be of any kind that can perform this function. This state of the operation of the internal combustion engine of our invention continues for as long as the roller 88 spins inside the circular groove 96, until the two-position gate 71 takes position 71*d*.

It is important to mention that the cylindrical connector 85 may be used as a control module of the spark plug 60 or the injection of the combustible product into the cylinder 42. The controlling of the two-position 71 may be done in conventional suitable manner as well.

The shape of the leaf groove 98 depends on the coefficient of the mechanism 26 of the present invention that is used for the present motor vehicle, the engine power, the kind of the combustible product.

It is one of the many objects of the present invention that the engine of the invention does not have either of the top dead center point, or the bottom dead center point. When the roller 88 is at the topmost position 88*a* and starts to moving towards point 88*b* and being inside the leaf shaped groove 98, partially-toothed connecting rod 78 is tangential to partially-toothed cylinder wheel 84, at the meeting point and transmits a tangent force upon partially-toothed cylinder wheel 84, thus a complete transmission of straight-line tangent force into a torque force. On the other hand, when the roller 88 starts moving from point 88*c* towards point 88*a*, the force transmitted to roller 88 is of the same direction as the direction that roller 88 goes and the friction is minimized because of the rolling of the respective roller 88 on the respective edge of the respective groove.

The reason that the roller 88 rolls in respect to its axes that is parallel to the axes of the drive shaft 99 is to minimize the friction force between the roller 88 and the respective edge of the respective groove.

During the reciprocating angular motion of partially-toothed cylinder wheel 84 in drive shaft 99 thee friction forces are minimized because the partially-toothed cylinder wheel 84 is independent to the drive shaft 99 and boundary flywheel with the centre of gravity non-axial 94.

The motor vehicle of our invention may be set up in such a way that the linear length of the movement of the piston 46 may be smaller than the diameter of the cylinder 42.

Regarding the industrial application of motor vehicle of our invention, a plurality number of cylinders may be positioned along the drive shaft 99 so as to alternate in order to achieve the output power required by the mission needed thereof. This means that respective pistons pause while respective reciprocate to generate the needed power. On the other hand, the engine of our invention runs at lower frequencies than prior art engines and achieves greater output power.

The configuration of the aforementioned elements of the present invention may also vary. The piston 46 may also be connected to two partially-toothed connecting rods 78 via a fixed support stick that is attached to the piston 46. The partially-toothed connecting rod 78 is connected to two partially-toothed cylinder wheels 84 and two or more boundary flywheel with the centre of gravity non-axial 94 placed along the drive shaft 99, as the industrial application requires. Another combination may be when one piston 46 is connected to two partially-toothed connecting rods 78 via a piston connection rod and to two partially-toothed cylinder wheels 84 on each side of the boundary flywheel with the centre of gravity non-axial 94. On the other hand the combination of the leaf shaped groove 98 and the circular groove 96 may vary according to the above configurations. Overall, other configurations that one skilled in the art may envision are acceptable. It is the combination of the aforementioned elements that make up the present invention that is novel, and results of such various combinations are novel as well.

Figure 4:
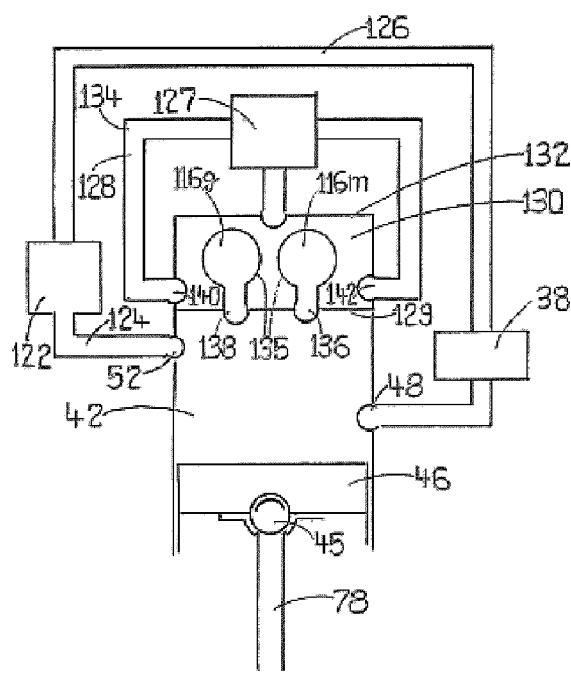
FIG. 4 illustrates a preferred embodiment of the external combustion engine of the present invention.

With reference to FIG. 4 the external combustion engine of our invention comprises a single-end cylinder chamber 42, piston 46 that makes reciprocating motions inside the cylinder chamber 42, heating chamber 116*g* and the heating chamber 116*m* which are used to heat the working gas. Chamber 116*g* and the chamber 116*m*, are positioned inside a main heating chamber 130, which is placed at the header 44 and the header 129.

The hot heating gas passes through the main chamber 130, which is used to heat the working gas inside the heating chambers 116*g* and 116*m*. The partition walls 135 of the chambers 116*g* and 116*m* are used as heat exchangers between chamber 130 and chambers 116*m* and 116*g*. The walls of the main heating chamber 130 are coated with a thermal insulation 132.

The inlet valve 48 lets the cold working gas to enter the cylinder chamber 42. The exit valve 52 lets the working gas out from the cylinder chamber 42. The heat exchanger 122 is used for cooling the warm working gas that exits the cylinder chamber 42.

The warm working gas passes through the tubes 124 to the heat exchanger 122, gets cooled in the heat exchanger 122, then the cold goes to the gas feeder 38 through the tube 126.

The hot gas passes through the tube 128, coming from the exchange chamber 127 that heats the working gas. Note that the heating gas passing through the tube 128 is a different gas, having no relation with the working gas passing through the tubes 124 and 126. Note also that the tubes 124 and 126 work on a closed cycle, which is separate from the close cycle of the heating gas on tube 128.

The heat insulating 134 of tube 128 does not allow the heat exchange from the inside the tube 128.

The inlet/outlet valve 136 through which the cool gas of low pressure enters the chamber 116*m* and the hot gas of high pressure leaves the chamber 116*m* to enter the cylinder chamber 42. The inlet/outlet valve 138 does the same function for the chamber 116*g*.

The inlet port 140 through which the hot gas enters the parent chamber 130, and exit port 142 through which the hot gas exits the parent chamber 130.

The gas feeder 38 is used to bring the cooled working gas into the cylinder 42 through the inlet valves 48 with a velocity determined by the engine power, coefficient of the invention mentioned before. It serves to reduce the temperature in the cylinder chamber 42.

The piston 46 is attached with the partially-toothed connecting rod 78 of the mechanism 26 by ball joints 45. The coefficient of invention for this exterior combustion engine is less then ⅕.

When the piston 46 is at the bottom position to the axes of the drive shaft 99, the exit valves 52 open and then inlet valves 48 open, in the cylinder chamber 42 of the working gas. The valve 136 is open and the valve 138 is closed, which are in the header 44 when the piston is at the bottom position to the axes of the drive shaft 99.

The cold working gas entering the cylinder chamber 42 through the inlet valve 48 pushes the warm working gas out through the exit valve 52, then the working gas goes through the tube 124 to the heat exchanger 122, there the gas cools and through the tube 126 goes to the gas feeder 38, then enters the cylinder chamber 42 through inlet valve 48. This happens during the pause of the piston 46.

The exit valve 52 closes when the cylinder chamber 42 is filled with cold working gas. Then the inlet valve 48 closes. The piston 46 starts the upwards compression stroke. The cold gas in the cylinder 42 is pressured in the chamber 116*m* until the piston 46 reaches the bottom position to the axes of the drive shaft 99. The valve 136 closes and the valve 138 opens. The valve 136 closes so the working gas gets heated in the chamber 116m. The valve 138 opens so the hot working gas of high pressure of the chamber 116g enters in the cylinder chamber 42 pushing the piston 46 down for the downward expansion stroke.

Meanwhile, the hot gas enters the main heating chamber 130 through the inlet port 140 and exchanges heat with the heating chambers 116m and 116g, then exits through the exit port 142, then goes to the heat exchanger 127 to get heated, then continues the closed cycle. When the piston 46 reaches the bottom position to the axes of the drive shaft 99, the reciprocating process repeats.

The present exterior combustion engine if used at the conventional prior art engines, which utilizes stable volume or stable pressure, increase their output power.

Regarding the industrial application, one may use a combination of more than two heating chambers 116 depending on the application.

Figure 7:
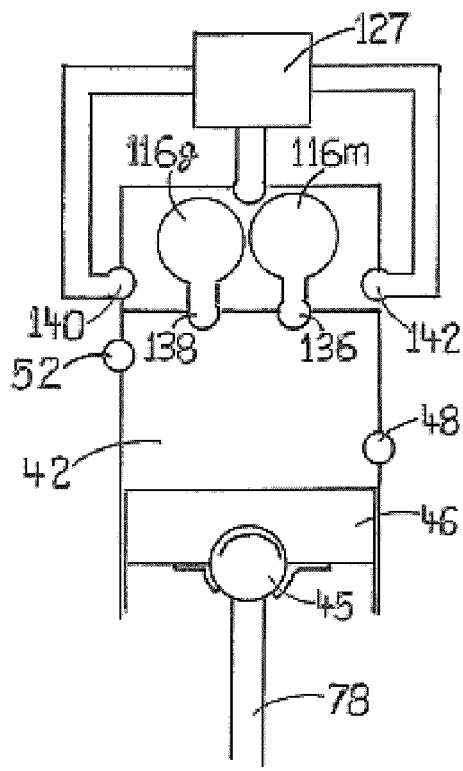
FIG. 7 is an illustration of the external combustion engine that utilizes chemical endothermic and chemical exothermic reactions.

With reference to FIG. 7, the external combustion engine utilizing chemical endothermic and chemical exothermic reactions is shown schematically. The engine of our invention has the same mode of operation and the same configuration as the exterior combustion engine of the previous teaching. Now we take away the heat exchanger 122, the inlet valve 48 and the exit valve 52 that are part of the control modules that are used to regulate the gas function in the cylinder chamber 42. While the working gas in the cylinder chamber 42, not only heats inside the chambers 116m and 116g from the parent chamber 130 and brings power onto the piston 46, but also should have the following properties: 1. When the piston 46 is at the bottom position to the axes of the drive shaft 99, the gas must start a chemical endothermic reaction to absorb the remaining heat energy and to cool the gas itself and the cylinder chamber 42. 2. When the gas is inside the chambers 116m or 116g it must start a chemical exothermic reaction after the valves 136 and 138 close.

While at the today's open cycle engines and close cycle engines the environment serves as the cooler, at the present engine the chemical endothermic reaction serves as the cooler.

We think that the modern industry is able to create a gas that can perform a chemical endothermic reaction at a normal temperature and a chemical exothermic reaction at higher temperatures than the final pressuring temperature.

We think that the external combustion engine utilizing chemical endothermic and chemical exothermic reactions can function. The prior art engines have a known output power and the working gas has higher temperatures after it gives power, thus the thermal energy is much higher in relation with the mass of the gas itself, so that the chemical endothermic reaction will not be suitable.

The piston does not stay at pause in the prior art engine. Because at the present invention engine the piston stays at pause for a period of time, the chemical endothermic reaction carries out completely.

Figure 6:
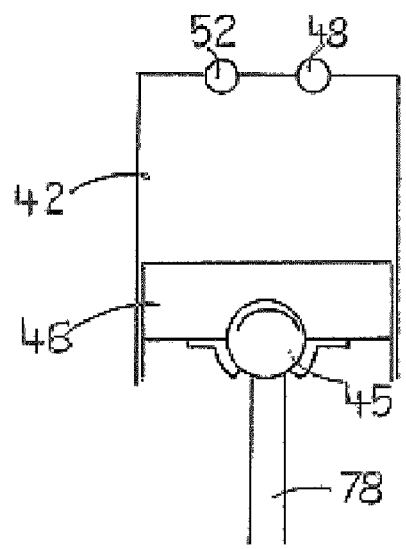
FIG. 6 is a schematic sectional view of the compressing device.

With reference to FIG. 6, the compressor of our invention comprises a cylinder 42, a piston 46, inlet valve 48 which lets the gas into the cylinder 42, exit valve 52 which lets the pressurized gas out of the cylinder 42. The pressurized gas passes through a transferring tube to where is needed, this being storage or other pressurized gas using devices.

This device further comprises the housing 72, the connecting rod 78, the roller 88 which is attached to the connecting rod 78 through the fixed support 90, boundary flywheel with the centre of gravity non-axial 94 together with the leaf shaped groove 98 and the circular groove 96, two-position gate 71, drive shaft 99 journaled to the housing 72 by the journal bearing 89, fastening device 74, and the seal assembly 76 and seal assembly 80 of the connecting rod 78. All of the above mentioned parts and their functions are disclosed at the aforementioned disclosure of the mechanism of our invention 26.

When the piston 46 goes for the downward stroke, the inlet valve 48 opens and uncompressed gas/liquid enters the cylinder 42. During the upstroke of the piston 46 the gas/liquid compresses and the compressed matter exits through the exit valve 52, the same way as in prior art compressors. At this compressor the circular motion turns into reciprocating linear motion.

The compression process of gas inside the cylinder 42 is the same as the process of the prior art compressors. The difference in the compressor of the present invention is that the piston 46 has pause time needed for particular application.

More than one compressor is placed along the drive shaft 99 to suit the functions, they alternate in order to accomplish the mission.

Figure 11:
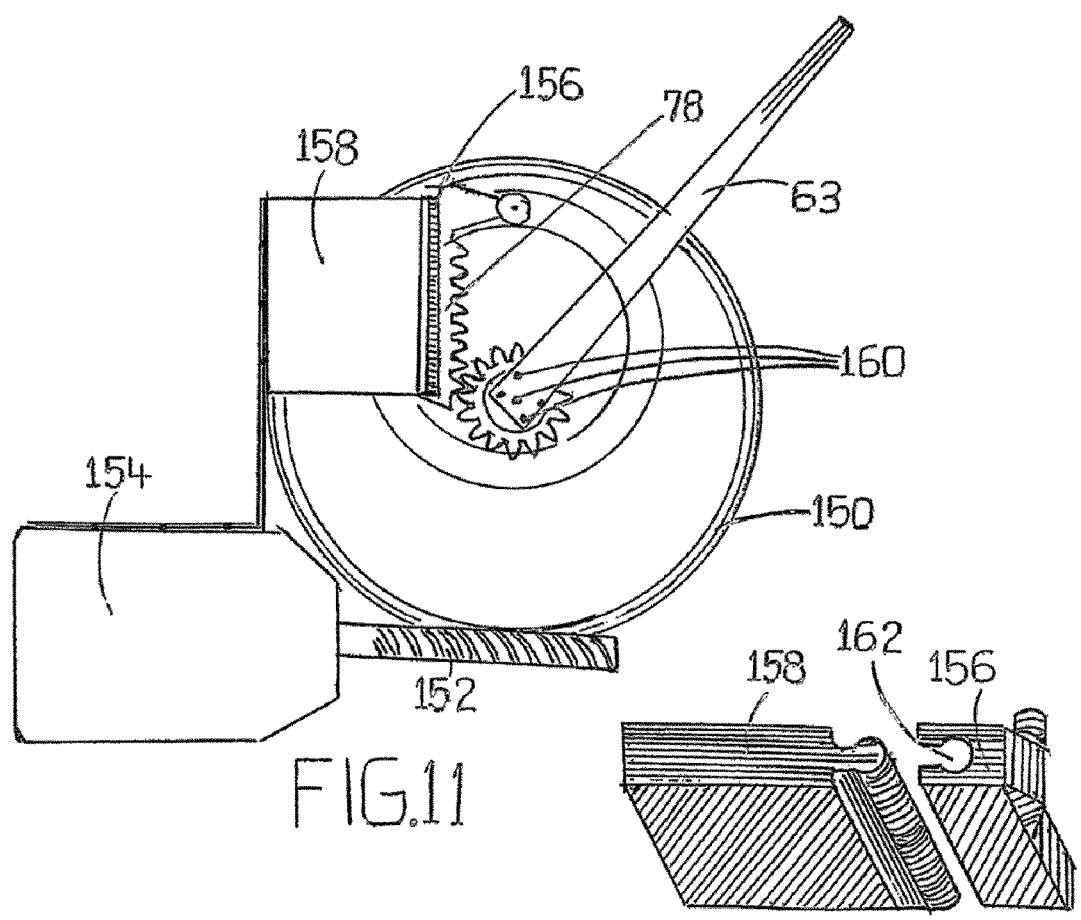
FIG. 11 illustrates the preferred embodiment of windshield wiper mechanism and the elevation of support carrier of the rod.

With reference to FIG. 11, the windshield wiper mechanism comprises an embodiment of mechanism 26, the partially-toothed connecting rod 78, which is fully indentured to the partially-toothed cylinder wheel 84 of the mechanism 26. The connecting rod 63, in which the windshield wiper is attached, is connected to the partially-toothed cylinder wheel 84 via bolts 160 and moves in reciprocating angular motion in unison with partially-toothed cylinder wheel 84. In the present windshield wiper mechanism the rotation motion turns into reciprocating angular motion. The cylindrical connector 85 is not needed for this function. The boundary wheel is also connected indentured by teeth 150. A cylindrical shaft 152 with slanted grooves is used to for activating rotation motion of the boundary flywheel with the centre of gravity non-axial 94 via slanted teeth 150, whereas the electromotor 154 activates the rotation motion of the cylindrical shaft 152. The carrier 156 and the partially-toothed connecting rod 78 are connected in a way so as partially-toothed connecting rod 78 and the carrier 156 make reciprocating linear motion in unison. The support carrier 158 is permanently attached to the housing 72 by any means that are suitable for attaching the two parts together. Carries 156 is connected to the support carrier 158 through groove 162 so as to make reciprocating linear motion together with partially-toothed connecting rod 78 there through. The windshield wiper mechanism of our invention cleans the windshield in a bigger angle than the prior art, it is more size efficient and requires less running power.

The aforementioned detailed description of the preferred embodiment of our invention has endeavored to enable those skilled in the art to carry out the invention. The writing skills of the inventions do not intend to be a limiting factor to the scope of the present invention. As the result we claim the following:

The invention claimed is:

1. A power take off mechanism for use with a reciprocating connecting rod to transfer reciprocating linear motion into rotating motion to rotate a drive shaft, the power take off mechanism comprising:

a partially-toothed gearing cylinder coaxial with the drive shaft that engages with a partially toothed portion of the reciprocating connecting rod to rotate the gearing cylinder in reciprocating angular motion independently of the drive shaft;

a first rotating boundary member, mounted to the drive shaft, so as to rotate in unison with the drive shaft; and a connecting system that operatively connects the gearing cylinder with the first rotating boundary member and with the drive shaft, the connecting system including a connecting roller that engages with a cylindrical aperture on the gearing cylinder to selectively engage the drive shaft into rotating motion;

wherein the reciprocating connecting rod includes a roller mechanism that engages a leaf shaped groove along at least one side of the first rotating boundary member, such that the leaf shaped groove defines limit points of the reciprocating linear motion of the reciprocating connecting rod and limit points of the reciprocating angular motion of the gearing cylinder;

wherein the leaf shaped groove comprises a path for the roller mechanism such that, when the partially toothed portion of the reciprocating connecting rod and the roller mechanism start linear motion towards a point on the leaf shaped groove that is closest to the drive shaft, the partially-toothed gearing cylinder starts angular motion and rotates in a direction of rotation of the driveshaft, thereby simultaneously causing the partially-toothed gearing cylinder to connect with the first rotating boundary member and the drive shaft to cause the drive shaft and the first rotating boundary member to rotate in a direction of rotation of the partially-toothed gearing cylinder.

2. The power takeoff mechanism as set forth in claim 1 wherein the first rotating boundary member further comprises a circular groove along at least one side of the rotating boundary member, that is selectively engaged by a gate mechanism that chooses at least one of the leaf shaped groove and the circular groove for engagement with the roller mechanism.

3. The power take off mechanism as set forth in claim 2 wherein the roller mechanism includes two rollers that vary in length, with respect to the axis parallel to the drive shaft.

4. The power take off mechanism as set forth in claim 2 wherein the leaf groove and the circular groove have indentured edges when the roller mechanism is indentured.

5. The power take off mechanism as set forth in claim 1 further comprising another rotating boundary mechanism that rotates coaxial with the drive shaft and the first rotating boundary mechanism, such that the first rotating boundary mechanism and the another rotating boundary mechanism together cause the drive shaft to rotate.

6. The power take off mechanism as set forth in claim 1 wherein the connecting rod is a piston from an internal combustion engine.

7. The power take off mechanism as set forth in claim 6 wherein the piston of the internal combustion engine drives the drive shaft of a motor vehicle.

8. The power take off mechanism as set forth in claim 1 wherein the reciprocating connecting rod is a piston from an external combustion engine.

9. The power take off mechanism as set forth in claim 1 wherein the reciprocating connecting rod is attached to an outer housing of the power take off mechanism by at least one seal assembly so as to make reciprocating linear motion therethrough.

10. A motor vehicle comprising:
at least one power take off mechanism for use with a reciprocating connecting rod of an internal combustion engine to transfer reciprocating linear motion into rotating motion to rotate a drive shaft of the motor vehicle;
a partially-toothed gearing cylinder coaxial with the drive shaft that engages with a partially toothed portion of the reciprocating connecting rod to rotate the gearing cylinder in reciprocating angular motion independently of the driveshaft; and
a rotating boundary member, mounted to the drive shaft of the motor vehicle, so as to rotate with the drive shaft, and including a connecting system that operatively connects the gearing cylinder with the rotating boundary member by a connecting roller that engages with a cylindrical aperture on the gearing cylinder to selectively engage the drive shaft into rotating motion
wherein the reciprocating connecting rod includes a roller mechanism that engages a leaf shaped groove along at least one side of the rotating boundary member, such that the leaf shaped groove defines limit points of the reciprocating linear motion of the reciprocating connecting rod and limit points of the reciprocating angular motion of the gearing cylinder;
wherein the leaf shaped groove comprises a path for the roller mechanism such that, when the partially toothed portion of the reciprocating connecting rod and the roller mechanism start linear motion towards a point on the leaf shaped groove that is closest to the drive shaft, the partially-toothed gearing cylinder starts angular motion and rotates in a direction of rotation of the driveshaft, thereby simultaneously causing the partially-toothed gearing cylinder to connect with the rotating boundary member and the drive shaft to cause the drive shaft and the rotating boundary member to rotate in a direction of rotation of the partially-toothed gearing cylinder.

11. The motor vehicle as set forth in claim 10 wherein the reciprocating connecting rod includes a roller mechanism that engages a leaf shaped groove along at least one side of the rotating boundary member, such that the leaf shaped groove defines the limit points of the reciprocating linear motion of the reciprocating rod and the limit point of the reciprocating angular motion of the gearing cylinder.

12. The motor vehicle as set forth in claim 10 wherein the rotating boundary member further comprises a circular groove along at least one side of the rotating boundary member, that is selectively engaged by a gate mechanism that chooses at least one of the leaf shaped groove and the circular groove for engagement with the roller mechanism.

13. The motor vehicle as set forth in claim 10 wherein the connecting system is selected from the group consisting of springs, magnetic fields and air exchange.

14. The power take off mechanism as set forth in claim 1 wherein the leaf shaped groove defines a path having a starting point of cyclical process at its farthest point from the drive shaft and continuing along in a linear direction to the point on the leaf shaped groove that is closest to the driveshaft.

* * * * *